United States Patent [19]

Mori et al.

[11] Patent Number: 4,563,734
[45] Date of Patent: Jan. 7, 1986

[54] MULTIVARIABLE PROPORTIONAL-INTEGRAL-DERIVATIVE PROCESS CONTROL APPARATUS

[75] Inventors: Yasuchika Mori, Kawasaki; Takashi Shigemasa, Yokohama, both of Japan

[73] Assignee: Tokyo Shibaura Denki Kabushiki Kaisha, Kawasaki, Japan

[21] Appl. No.: 531,649

[22] Filed: Sep. 13, 1983

[30] Foreign Application Priority Data

Sep. 25, 1982 [JP] Japan ................... 57-166040

[51] Int. Cl.[4] ............ G05B 13/04; G05B 17/02; G06F 15/31
[52] U.S. Cl. ................... 364/157; 364/151; 364/553; 364/150; 318/610
[58] Field of Search ............ 364/149–151, 364/157–159, 162, 164–165, 194, 553; 318/609–610, 561

[56] References Cited

U.S. PATENT DOCUMENTS

| | | | |
|---|---|---|---|
| 3,718,813 | 2/1973 | Williams, Jr. et al. | 364/553 X |
| 4,067,060 | 1/1978 | Poussart et al. | 364/553 |
| 4,214,300 | 7/1980 | Barlow et al. | 364/159 X |
| 4,232,364 | 11/1980 | Bibbero | 364/159 X |
| 4,407,013 | 9/1983 | Arcara et al. | 364/149 |
| 4,451,878 | 5/1984 | Shigemasa | 364/151 |

FOREIGN PATENT DOCUMENTS

0045857  2/1982  European Pat. Off. .

OTHER PUBLICATIONS

Journal A, vol. 22, No. 4, Oct. 1981, pp. 192–198, Antwerp, BE; J. Van Amerongen: "MRAS: Model Reference Adaptive Systems".

IEEE Transactions on Automatic Control, Dec. 1976, pp. 837–840, New York, US: T. Soderstrom et al., "Identifiability Conditions for Linear Multivariable Systems Operating Under Feedback".

Primary Examiner—Gary V. Harkcom
Attorney, Agent, or Firm—Oblon, Fisher, Spivak, McClelland & Maier

[57] ABSTRACT

A process control apparatus wherein dynamic characteristics of a process are identified in accordance with process inputs and outputs, so as to tune digital PID (Proportional-Integral-Derivative) parameters in accordance with the identified dynamic characteristics. The process is an N-input/output process having an interference between the process inputs and outputs. Each transfer function between a given process input and process output is identified. A transfer function between a set-point signal and the process output is obtained and matched with that of an N-input/output decoupled reference model, to tune the PID parameters.

5 Claims, 6 Drawing Figures

MULTIVARIABLE PROPORTIONAL-INTEGRAL-DERIVATIVE PROCESS CONTROL APPARATUS

BACKGROUND OF THE INVENTION

The present invention relates to a process control apparatus for digitally controlling a process.

In a conventional process control apparatus, a transfer function of a process is identified in accordance with an input signal (control variable) to the process and an output signal (controlled variable) therefrom. PID (Proportional-Integral-Derivative) parameters are then determined in accordance with an identified transfer function, thereby controlling the process by using PID parameters. The process is assumed to be a single input/output process when the transfer function is identified. In other words, the conventional process control apparatus serves only as a single loop controller having a single control loop. However, in practice, many processes function as multi-input/output processes. In this case, if a one-to-one correspondence is established with respect to an input/output pair (i.e., one input influences one output), single loop controllers corresponding in number to inputs or outputs are provided to control the multi-input/output process. However, general multi-input/output processes cannot be controlled by a plurality of single loop controllers corresponding in number to inputs or outputs.

SUMMARY OF THE INVENTION

It is an object of the present invention to provide a process control apparatus for identifying a transfer function of a multi-input/output process having an interference between process parameters, for determining PID parameters in accordance with an identified transfer function, and for digitally controlling the process by using the (Proportional-Integral-Derivative) PID parameters.

To achieve the above object of the present invention, there is provided a process control apparatus for an N- (where N is any positive integer not less than 2) input/output process, comprising a PID controller for controlling said process in accordance with PID parameters and control errors respectively as differences between N outputs from said process and set-point values for the N outputs, a signal generator for superposing N persistently exciting identification signals respectively on the N inputs to said process, a pulse transfer function identifying circuit for identifying Z-transfer functions corresponding to all input-to-output combinations in accordance with the N inputs to said process and the N outputs from said process while the N persistently exciting identification signals are respectively superposed on the N inputs, an S-transfer function calculator for calculating an S-transfer function of said process in accordance with identified Z-transfer functions, and a circuit for matching an S-transfer function between a set-point value of a process control system and a process output which is obtained from a calculated S-transfer function with an S-transfer function between a set-point value and the process output of an N-input/output decoupled reference model and for tuning the PID parameters of the PID controller in accordance with matched results.

DETAILED DESCRIPTION OF THE PREFERRED EMBODIMENT

Figure 1:
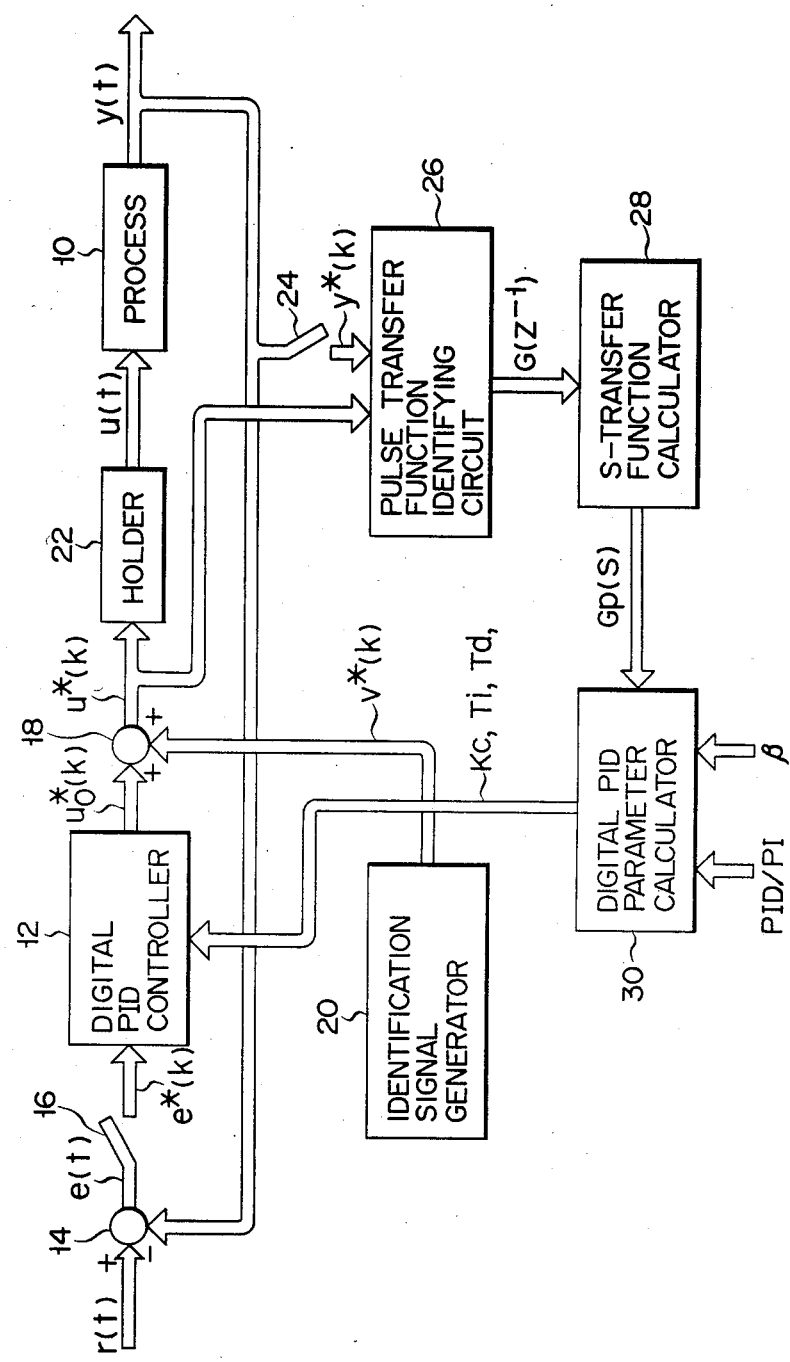
FIG. 1 is a block diagram showing the overall configuration of a process control apparatus according to the present invention.

A process control apparatus according to an embodiment of the present invention will be described with reference to the accompanying drawings. FIG. 1 is a block diagram showing the overall configuration of the process control system. The process control system comprises a closed loop control system having a multi-input/output process 10 and a digital PID (Proportional-Integral-Derivative) controller 12.

The process 10 has a plurality of controlled variables (process outputs) such as temperature, humidity, pressure, flow rate, etc., and a plurality of control variables (process inputs). Each controlled variable is influenced by the corresponding control variable. However, each controlled variable may be influenced by other control variables in some cases.

When the number of inputs to the process or outputs therefrom is given as N (where N is any positive integer not less than 2), the closed loop control system has N control loops. All signals of the control system comprise N-dimensional vectors, respectively. A present value of the controlled variable is produced as a process output signal $y_i(t)$ (for $i=1, 2, \ldots, N$) from the process 10. A set-point signal $r_i(t)$ and the process output signal $y_i(t)$ are respectively supplied to a (+) input terminal and a (−) input terminal of an adder 14. The adder 14 produces a control error $e_i(t) = r_i(t) - y_i(t)$ for each loop. The control error signal $e_i(t)$ is sampled to produce a discrete-time control error signal $e_i^*(k)$ by a sampler 16. The signal $e_i^*(k)$ is supplied to the digital PID controller 12. A sampling period $\tau_i$ may vary between loops. Here, it should be noted that $k = t/\tau_i$. In accordance with the control error signal $e_i^*(k)$ and digital PID parameters Kc, Ti and Td, the controller 12 produces a control variable $u_{0i}^*(k)$ for controlling each variable to be controlled. To satisfy identifiability conditions of dynamic characteristics of process during closed loop control (e.g., T. Söderström, L. Ljung and I. Gustavsoon: Identifiability Conditions for Linear Multivariable Systems Operating under Feedback, IEEE Trans. Automatic Control AC-21, 1976), the control system receives a persistently exciting identification signal. More particularly, the output $u_{0i}^*(k)$ from the controller 12 and an output $v_i^*(k)$ from an identification signal generator 20 are added by an adder 18 to produce a control signal $u_i^*(k)$. A control signal $u_i(t)$ along a continuous time base is obtained from the control signal $u_i^*(k)$ through a 0th-order holder 22. The control variable $u_i(t)$ is then supplied to the process 10.

Figure 2:
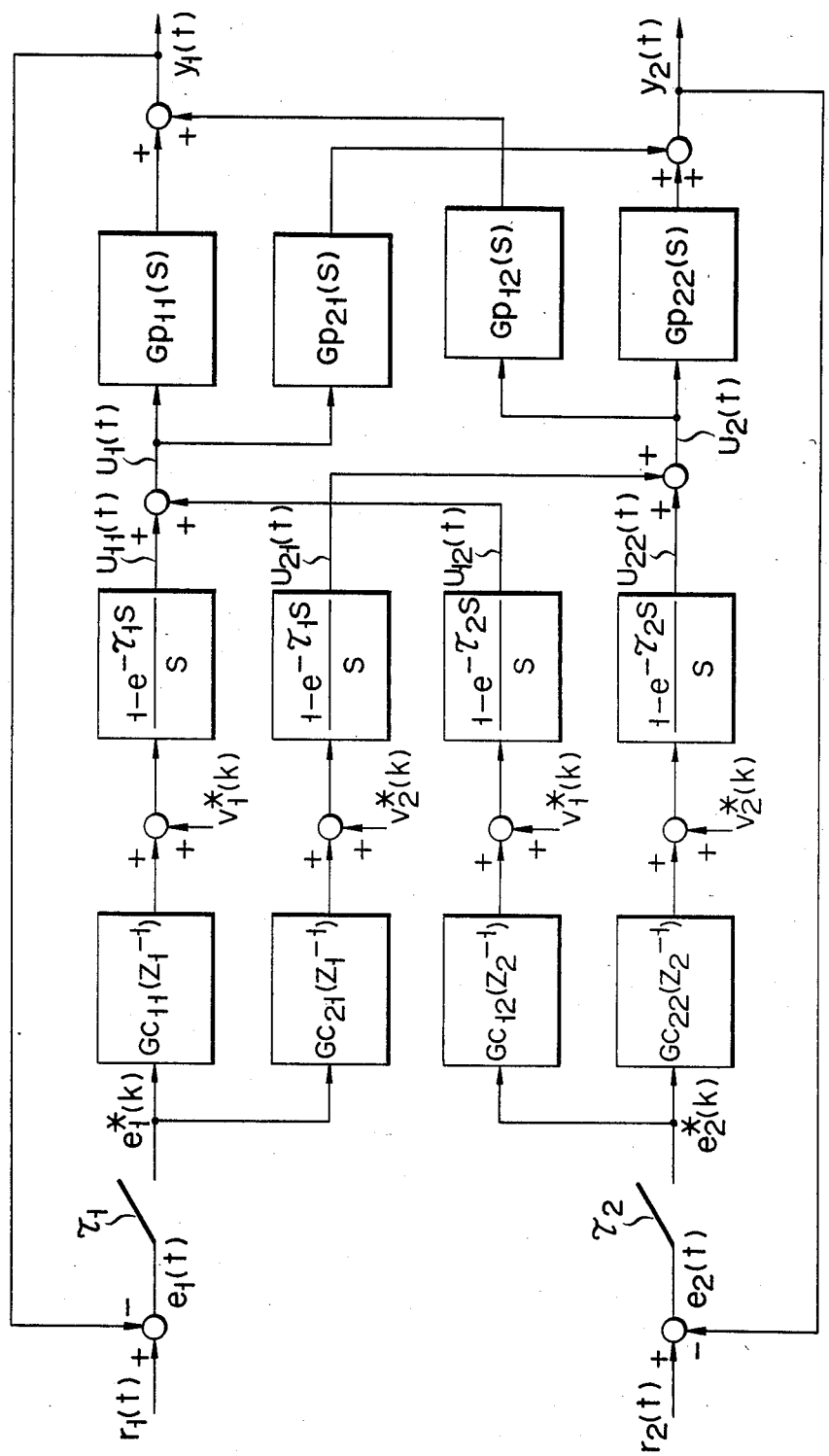
FIG. 2 is a detailed wiring diagram of a closed loop control system when a process is regarded as a 2-input/output process.

The control system of FIG. 1 will be described in detail with reference to signals of each loop in accordance with FIG. 2. FIG. 2 shows a closed loop control system of a 2-input/output process. This process has an interference between the inputs and the outputs, and has four transfer functions: transfer functions $Gp_{11}(s)$ and $Gp_{22}(s)$ of the two main loops and interference transfer functions $Gp_{21}(s)$ and $Gp_{12}(s)$. Note that a transfer function $Gp_{ij}(s)$ indicates a transfer function between a process input signal $u_j(t)$ and a process output signal $y_i(t)$. Since the process is controlled by four transfer functions, the controller is also controlled by four transfer functions. Note that sampling periods of the sampler are given as $\tau_1$ and $\tau_2$ for the respective loops. Therefore, holders having the periods $\tau_1$ and $\tau_2$ are used, and identification signals $v_1^*(k)$ and $v_2^*(k)$ are used for the respective loops.

Referring again to FIG. 1, the identification/tuning section will be described. The process output signal $y_i(t)$ from the process 10 is supplied to a sampler 24 which is operated in synchronism with the sampler 16. The sampler 24 samples the process output signal $y_i(t)$ and produces a signal $y_i^*(k)$. The signal $u_i^*(k)$ and the signal $y_i^*(k)$ are supplied to a pulse transfer function identifying circuit 26. The identifying circuit 26 identifies a Z-transfer function $G_{ij}(z_i^{-1})$ of the process. It should be noted that $z_i = e^{\tau_i s}$. The identified Z-transfer function $G_{ij}(z_i^{-1})$ is supplied to an S-transfer function calculator 28. The Z-transfer function $G_{ij}(z_i^{-1})$ is converted to an S-transfer function $Gp_{ij}(s)$. The S-transfer function $Gp_{ij}(s)$ is supplied to a digital PID parameter calculator 30. The parameter calculator 30 receives a mode signal PID/PI for determining the operating mode of the controller 12 and a response shape parameter $\beta$ of the reference model. The parameter calculator 30 matches the S-transfer function of the closed loop control system 10 with the S-transfer function of the reference model to obtain the digital PID parameters $Kc_{ij}$, $Ti_{ij}$ and $Td_{ij}$. These parameters are supplied to the controller 12.

The operation of the process control apparatus having the configuration described above will be described hereinafter.

To identify the process dynamic characteristics during the closed loop control, the identification signal $v_i^*(k)$ is superposed on the signal $u_{0i}^*(k)$ of each loop. In this embodiment, a maximum period sequence (M-sequence) signal is selected as an identification signal. The M-sequence signal is represented by equation (1):

$$v_i^*(k) = AM \cdot \{2m(k) - 1\} \quad (1)$$

for $$m(k) = \mathrm{MOD}[m(k-1) + m(k-7), 2]$$

where 127 is the period of the M-sequence signal, AM is the amplitude thereof, and MOD denotes the modulo operation. The dynamic characteristics of the process during the closed loop control can be identified. In this embodiment, the Z-transfer function of the process is identified in accordance with the discrete-time process inputs and outputs.

Figure 3:
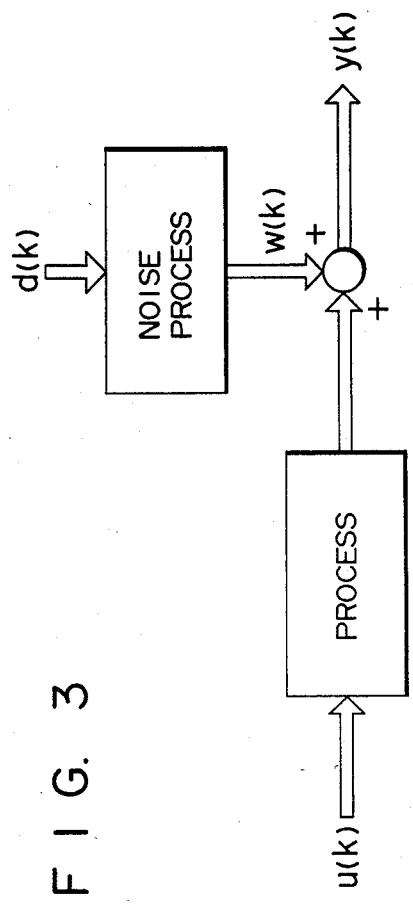
FIG. 3 is a block diagram showing a process model for identifying dynamic characteristics of the process.

In general, a discrete-time model of the multi-input/output process is illustrated in FIG. 3. The following equations can be obtained with reference to FIG. 3:

$$y(k) = G(z^{-1})u(k) + w(k) \quad (2)$$

$$w(k) = Gn(z^{-1})d(k) \quad (3)$$

where
 $y(k)$: N-dimensional vector in the process output
 $u(k)$: N-dimensional vector in the process input
 $d(k)$: N-dimensional vector in white noise $$E\{d(k)\} = 0$$

$$E\{d(k)d^T(l)\} = \delta_{kl} \Lambda$$

where $\delta_{kl} = 1$ for $k = l$, and $\delta_{kl} = 0$ for $k \neq l$, and $\Lambda$ is the covariance matrix.

$G(z^{-1})$: $N \times N$ matrix having as an element $$G_{ij}(z_i^{-1}) = B_{ij}(z_i^{-1})/A_{ij}(z_i^{-1})$$

$Gn(z^{-1})$: diagonal matrix having as an element $$Gn_{ii}(z_i^{-1}) = D_i(z_i^{-1})/C_i(z_i^{-1})$$

$A_{ij}(z_i^{-1})$,
 $B_{ij}(z_i^{-1})$,
 $C_i(z_i^{-1})$,
 $D_i(z_i^{-1})$: polynomials of $z^{-1}$ When equation (3) is substituted into equation (2), and equation (2) is represented by its components, the following is obtained:

$$\begin{bmatrix} y_1(k) \\ \cdot \\ \cdot \\ \cdot \\ y_N(k) \end{bmatrix} = \begin{bmatrix} B_{11}(z_1^{-1})/A_{11}(z_1^{-1}) & \cdots & B_{1N}(z_1^{-1})/A_{1N}(z_1^{-1}) \\ \cdot & & \cdot \\ \cdot & & \cdot \\ B_{N1}(z_N^{-1})/A_{N1}(z_N^{-1}) & \cdots & B_{NN}(z_N^{-1})/A_{NN}(z_N^{-1}) \end{bmatrix} \times \begin{bmatrix} u_1(k) \\ \cdot \\ \cdot \\ u_N(k) \end{bmatrix} + \begin{bmatrix} D_1(z_1^{-1})/C_1(z_1^{-1}) & & 0 \\ & \ddots & \\ 0 & & D_N(z_N^{-1})/C_N(z_N^{-1}) \end{bmatrix} \times \begin{bmatrix} d_1(k) \\ \cdot \\ \cdot \\ d_N(k) \end{bmatrix} \quad (4)$$

Equation (4) for the ith process output $y_i(k)$ may be rewritten in the following manner:

$$\begin{aligned} y_i(k) = &\{B_{i1}(z_i^{-1})/A_{i1}(z_i^{-1})\}u_1(k) + \\ &\{B_{i2}(z_i^{-1})/A_{i2}(z_i^{-1})\}u_2(k) + \ldots + \\ &\{B_{iN}(z_i^{-1})/A_{iN}(z_i^{-1})\}u_N(k) + \{D_i(z_i^{-1})/C_i(z_i^{-1})\}d_i(k) \end{aligned} \quad (5)$$

Equation (5) indicates a model for an N-input/one-output process. Therefore, the N-input/N-output process can be represented by a combination of the N-input/one-output processes. Reducing fractions to a common denomination in equation (5), the following equation is obtained:

$$A^*(z_i^{-1})y_i(k) = B_1^*(z_i^{-1})u_1(k) + \ldots + \\ B_N^*(z_i^{-1})u_N(k) + C^*(z_i^{-1})d_i(k) \quad (6)$$

-continued for
$$A^*(z_i^{-1}) = A_{i1}(z_i^{-1})A_{i2}(z_i^{-1})\ldots A_{iN}(z_i^{-1})C_i(z_i^{-1})$$
$$= 1 + a_1^*z_i^{-1} + \ldots + a_{na}^*z_i^{-na}$$
$$B_1^*(z_i^{-1}) = B_{i1}(z_i^{-1})A_{i2}(z_i^{-1})\ldots A_{iN}(z_i^{-1})C_i(z_i^{-1})$$
$$= b_{11}^*(z_i^{-1})z_i^{-1} + \ldots + b_{1nb1}^*z_i^{-nb1}$$
$$\vdots$$
$$B_N^*(z_i^{-1}) = A_{i1}(z_i^{-1})\ldots A_{iN-1}(z_i^{-1})B_{iN}(z_i^{-1})C_i(z_i^{-1})$$
$$= b_{N1}^*(z_i^{-1})z_i^{-1} + \ldots + b_{NnbN}^*z_i^{-nbN}$$
$$C^*(z_i^{-1}) = A_{N1}(z_i^{-1})\ldots A_{NN}(z_i^{-1})D_i(z_i^{-1})$$
$$= 1 + C_1^*z_i^{-1} + \ldots + C_{nc}^*z_i^{-nc}$$

According to equation (6), a parameter prediction technique used for identification of the one-input/output system can also be used for identification of the dynamic characteristics of the multi-input/output system. In the pulse transfer function identifying circuit 26 of this embodiment, the Z-transfer function $G(z^{-1})$ of the process is identified by a recursive least square (RLS) algorithm. The Z-transfer function can be identified by identifying unknown parameters $a_1^*, \ldots, a_{na}^*$, $b_{11}^*, \ldots, b_{1nb1}^*, \ldots, b_{N1}^*, \ldots, b_{NnbN}^*$, and $C_1^*, \ldots, C_{nc}^*$. The process model can be expressed in accordance with the RLS algorithm.

$$y(k+1) = \phi^T(k+1)\theta(k) + \epsilon(k+1) \quad (7)$$

where T denotes the transpose. A vector $\phi(k)$ and an unknown parameter vector $\theta(k)$ are given as follows:
$$\phi(k) = [-y_i(k-1), \ldots, -y_i(k-na), u_1(k-1), \ldots,$$
$$u_1(k-nb1), \ldots, u_N(k-1), \ldots, u_N(k-nbN)]^T \quad (8)$$

$$\theta = [a_1, \ldots, a_{na}, b_{11}, \ldots, b_{1nb1}, \ldots, b_{N1}, \ldots, b_{NnbN}]^T \quad (9)$$

The RLS algorithm can be given as follows:

$$\theta(k+1) = \theta(k) + K(k+1)\epsilon(k+1) \quad (10)$$

$$K(k+1) = \{P(k)\phi(k+1)\}/\{\lambda(k+1) + \phi^T(k+1)P(k)\phi(k+1)\} \quad (11)$$

$$P(k+1) = [P(k) - \{P(k)\phi(k+1)\phi^T(k+1)P(k)\}/\{\lambda(k+1) + \phi^T(k+1)P(k)\phi(k+1)\}]/\lambda(k+1) \quad (12)$$

$$\lambda(k+1) = \lambda_0\lambda(k+1) + (1-\lambda_0) \quad (13)$$

where $\lambda(k)$ is the forgetting factor.

The initial values of this algorithm are $\theta(0) = 0$ and $P(0) = \nu I$ where $\nu$ is a positive large number and I is a unit matrix. The Z-transfer functions $G_{i1}(z_i^{-1}), \ldots, G_{iN}(z_i^{-1})$ for one process output $y_i^*(k)$ are obtained. The identifying circuit 26 repeats the algorithm N times to identify the Z-transfer functions for all process outputs. A recursive extended least square (RELS) algorithm, a recursive maximum likelihood or the like may be used as an unknown parameter prediction technique instead of the RLS algorithm. The vectors $\phi(k)$ and $\theta$ of the RELS algorithm are given as follows:

$$\phi(k) = [-y_i(k-1), \ldots, -y_i(k-na), u_1(k-1), \ldots,$$
$$u_1(k-nb1), \ldots, u_N(k-1), \ldots, u_N(k-nbN),$$
$$\epsilon(k-1), \ldots, \epsilon(k-nc)]^T \quad (14)$$

$$\theta = [a_1, \ldots, a_{na}, b_{11}, \ldots, b_{1nb1}, \ldots, b_{N1}, \ldots,$$
$$b_{NnbN}, c_1, \ldots, c_{nc}]^T \quad (15)$$

As described above, the dynamic characteristics of process can be identified as the Z-transfer function. The PID control parameters are obtained from the S-transfer function in a manner to be described later. The identified Z-transfer function is transformed by the S-transfer function calculator 28 to an S-transfer function. More particularly, the elements $G_{ij}(z_i^{-1})$ for $i = 1, \ldots, N$ and $j = 1, \ldots, N$ of the Z-transfer function in equation (2) are respectively transformed to the S-transfer functions using the following technique. Thereafter, each of the obtained S-transfer functions is reduced to a common denominator to obtain a general transfer function for multi-input/output processes. A method for obtaining coefficients $G_0$ and $G_1$ of the following equation is described first.

$$G_p(s) = 1/(G_0 + G_1s + G_2s^2 + G_3s^3 + \ldots) \quad (16)$$

A Z-transfer function $G(z^{-1})$ of the subprocess is defined as follows:

$$G(z^{-1}) = \left(\sum_{i=1}^{nb} b_i z^{-i}\right) / \left(1 + \sum_{i=1}^{na} a_i z^{-i}\right) \quad (17)$$
$$= \sum_{i=0}^{\infty} g_i \cdot z^{-i}$$

The step response in equation (17) is given as $x_n$ defined as follows:

$$x_n = \sum_{i=0}^{n} g_i \quad (n = 0, 1, 2 \ldots) \quad (18)$$

The step response $x_n$ is approximated by an m-order polynomial as a function of t, so that $$\tilde{x}_n(t) = \sum_{i=0}^{m} f_{i,n} \cdot (t - n\tau)^i \quad (19)$$

for $n\tau \leq t \leq (n+1)\tau$

The coefficients $f_{i,n}$ ($i = 0, 1, \ldots, m$) are obtained on the basis of $$x_n(j\tau) = x_j (j = n+1, n, n-1, \ldots, n-m+1) \quad (20)$$

by solving the following simultaneous equations:

$$\begin{pmatrix} x_{n+1} \\ x_n \\ x_{n-1} \\ \vdots \\ x_{n-m+1} \end{pmatrix} = \quad (21)$$

$$\begin{pmatrix} 1 & \tau & \tau^2 & \cdots & \tau^{m-1} \\ 1 & 0 & 0 & \cdots & 0 \\ 1 & -\tau & -\tau^2 & \cdots & (-\tau)^{m-1} \\ \vdots & \vdots & \vdots & & \vdots \\ 1 & -(m-1)\tau & -(m-1)\tau^2 & \cdots & (-(m-1)\tau)^{m-1} \end{pmatrix} \begin{pmatrix} f_0 \\ f_{1,n} \\ f_{2,n} \\ \vdots \\ f_{m,n} \end{pmatrix}$$

When the following equations are given:

$$\tilde{X}_n(s) = \int_{n\tau}^{(n+1)\tau} \tilde{x}_n(t)e^{-st}dt \quad (22)$$

$$\tilde{X}(s) = \sum_{n=0}^{\infty} \tilde{X}_n(s) \quad (23)$$

X(s) is regarded as an approximation of a Laplace transform X(s) of the step response x(t) of the controlled objective. Therefore, an S-transfer function Gp(s) can be calculated from equation (20) as follows:

$$Gp(s) = SX(s) \quad (24)$$

The solution to equation (21) is substituted in equations (22) to (24) to give:

$$Gp(s) = Gp(e^{-\tau s}) \cdot \Delta^{(m)}(s) \quad (25)$$

The first term of the right-hand side of equation (25) is obtained by substituting $z = e^{\tau s}$ in the Z-transfer function $G(z^{-1})$ of equation (17), and the second term thereof is a correction term. When equation (26) is given as follows:

$$G(e^{\tau s}) = 1/(C_0 + C_1 s + C_2 s^2 + C_3 s^3 + \ldots) \quad (26)$$

the coefficients $C_i$ (i = 0, 1, 2, ...) are obtained.

$$C_0 = A_0/B_0 \quad (27)$$

$$C_n = \left( A_n - \sum_{i=0}^{n-1} C_i B_{n-i} \right) / B_0 \quad (28)$$

for n = 1, 2, ...

$$A_0 = 1 + \sum_{n=1}^{na} a_i \quad (29)$$

$$A_n = \{(-\tau)^n/n!\} \sum_{i=1}^{na} i^n \cdot a_i \quad (30)$$

for n = 1, 2, ...

$$B_0 = \sum_{i=1}^{nb} b_i \quad (31)$$

$$B_n = \{(-\tau)^n/n!\} \sum_{i=1}^{nb} i^n \cdot b_i \quad (32)$$

for n = 1, 2, ...

The correction term $\Delta^{(m)}(s)$ is expressed as follows:

$$\Delta^{(m)}(s) = d_0 + d_1(\tau s) + d_2(\tau s)^2 + \ldots \quad (33)$$

The denominator coefficient of the S-transfer function Gp(s) can be obtained as follows:

$$\tilde{G}_0 = C_0 \quad (34)$$

$$\tilde{G}_n = C_n - \sum_{i=1}^{n} d_i \tilde{G}_{n-i} \tau^i \quad (35)$$

for n = 1, 2, ...

The S-transfer function calculator 28 transforms each Z-transfer function $G_{ij}(z^{-1})$ to the S-transfer function $Gp_{ij}(s)$ by the above means. In general, denominator polynomials of the transfer functions $Gp_{ij}(s)$ differ from each other. The denominator polynomials are then reduced to a common denominator to obtain the general transfer function for the multi-input/output processes.

In particular, the transfer function Gp(s) for the multi-input/output process 10 is obtained as follows:

$$\begin{aligned} Gp(s) &= B(s)/a(s) \\ &= (B_0 + B_1 s + B_2 s^2 + B_3 s^3 + \ldots) \\ &\quad /(a_0 + a_1 s + a_2 s^2 + a_3 s^3 + \ldots) \end{aligned} \quad (36)$$

for $a_i \in R^1, a_0 \neq 0, B_i \in R^{N \times N}$, and $B_0 \neq 0$

The operation of the digital PID parameter calculator 30 will be described wherein the PID parameters Kc, Ti and Td for the digital PID controller 12 are tuned in accordance with the identified transfer function Gp(s).

Figure 4:
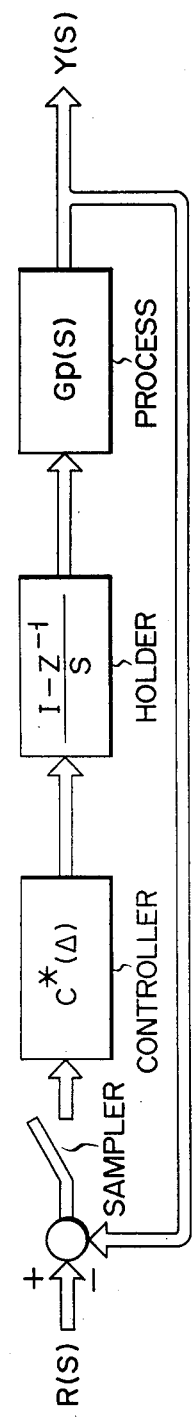
FIG. 4 is a block diagram showing a control system model for obtaining PID parameters of a PID controller.

The closed loop control system is illustrated in FIG. 4. The operations of the PID controller 12 are expressed as follows:

$$C^*(\Delta) = C_0^* \Delta^{-1} + C_1^* + C_2^* \Delta + \ldots \quad (37)$$

$$\Delta = \begin{bmatrix} \delta_1 & & 0 \\ & \delta_2 & \\ & & \ddots \\ 0 & & \delta_N \end{bmatrix} \quad (38)$$

for $\delta_i = (1 - z_i^{-1})/\tau_i \; (z_i = e^{\tau_i s}) \quad (39)$ $\delta_i$ in equation (39) is a difference operator and corresponds to the well-known differential operator s for a continuous time system. As the sampling frequency $\tau_i$ is decreased to zero, $k/\delta_i$ becomes k/s, and $k\delta_i$ becomes ks. The approximate expression of the PID controller 12 is obtained along a continuous time base as follows. For example, the controller performs the P operation and the sampler and holder are operated with a period of $\tau_i$. The controller can be approximated by the expression $k(1 - z_i^{-1})/\tau_i s$. In this embodiment, the sampling frequencies differ in accordance with the loops, so that the following matrices are given:

$$T = \begin{bmatrix} \tau_1 & & 0 \\ & \tau_2 & \\ & & \ddots \\ 0 & & \tau_N \end{bmatrix} \quad (40)$$

$$Z = \begin{bmatrix} z_1 & & 0 \\ & z_2 & \\ & & \ddots \\ 0 & & z_N \end{bmatrix} \quad (41)$$

When these matrices are used, the approximate expression of the controller as a function of the continuous time is given as follows:

$$\begin{aligned} C(s)/s &= [C^*(\Delta)T^{-1}(I - Z^{-1})]/s \\ &= [C_0^* + C_1^* \Delta + C_2^* \Delta^2 + \ldots]/s \end{aligned} \quad (42)$$

The S-transfer function of the control system between the set-point signal R(s) and the process output Y(s) is matched with the reference model M(s), and the following tautological expression (43) is derived:

$$I + sC^{-1}(s)H(s) = M(s) \quad (43)$$

for $H(s) \triangleq B^{-1}(s)a(s) = Gp(s) \quad (44)$

According to equation (36), $$G_p(s) = H^{-1}(s) \quad (45)$$
$$= (H_0 + H_1 s + H_2 s^2 + H_3 s^3 + \ldots)^{-1}$$

where $$H_0 = a_0 B_0^{-1} \quad (46)$$

$$H_1 = (a_1 I - H_0 B_1) B_0^{-1} \quad (47)$$

$$H_2 = (a_2 I - H_0 B_2 - H_1 B_1) B_0^{-1} \quad (48)$$

$$H_3 = (a_3 I - H_0 B_3 - H_1 B_2 - H_2 B_1) B_0^{-1} \quad (49)$$

The following model which has no interference is selected as the reference model M(s):

$$M(s) = I + \Sigma s + \Gamma_2 \Sigma^2 s^2 + \Gamma_3 \Sigma^3 s^3 + \Gamma_4 \Sigma^4 s^4 + \ldots \quad (50)$$

$$\Sigma = \begin{bmatrix} \sigma_1 & & 0 \\ & \sigma_2 & \\ 0 & & \ddots \\ & & & \sigma_N \end{bmatrix} \quad (51)$$

$$\Gamma_2 = \begin{bmatrix} \gamma_{21} & & 0 \\ & \gamma_{22} & \\ 0 & & \ddots \\ & & & \gamma_{2N} \end{bmatrix} \quad (52)$$

for $\gamma_{2i} = \beta_i/2 + (1 - \beta_i)/3$ (PI operation)
$= \beta_i/2 + 3(1 - \beta_i)/8$ (PID operation)

$$\Gamma_3 = \begin{bmatrix} \gamma_{31} & & 0 \\ & \gamma_{32} & \\ 0 & & \ddots \\ & & & \gamma_{3N} \end{bmatrix} \quad (53)$$

for $\gamma_{3i} = 3\beta_i/20 + (1 - \beta_i)/27$ (PI operation)
$= 3\beta_i/20 + (1 - \beta_i)/16$ (PID operation)

$$\Gamma_4 = \begin{bmatrix} \gamma_{41} & & 0 \\ & \gamma_{42} & \\ 0 & & \ddots \\ & & & \gamma_{4N} \end{bmatrix} \quad (54)$$

for $\gamma_{4i} = 3\beta_i/100 + (1 - \beta_i)/256$ (PID operation)

Figure 5:
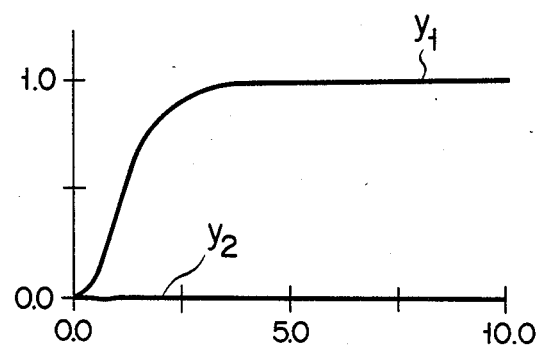
FIGS. 5 and 6 respectively show step responses of respective loops of a designed control system when a response shape parameter changes.
Figure 6:
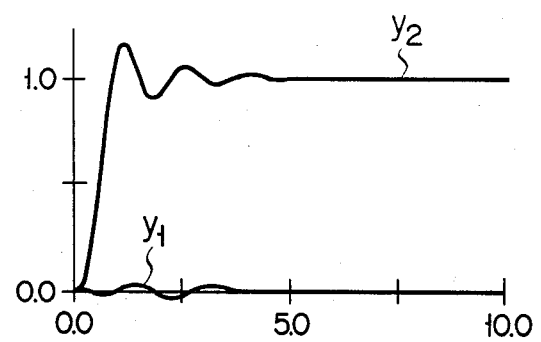

According to this embodiment, the response shape of the reference model can be easily changed in accordance with the response shape parameter $\beta_i$. The response shape parameter $\beta_i$ can be set independently for each loop, so that the reference model can be set independently for each loop. This parameter $\beta_i$ is selected in the range between 0 and 1.0. FIGS. 5 and 6 show step responses of the designed closed loop control system when the response shape parameters $\beta_i$ are given as $\beta_1 = 0$ and $\beta_2 = 1.0$ for N=2. FIG. 5 shows process outputs $y_1$ and $y_2$ when the set-point signal $r_1$ changes in a stepwise manner. The output $y_1$ has substantially no overshoot. FIG. 6 shows process outputs $y_1$ and $y_2$ when the set-point signal $r_2$ changes in a stepwise manner. The output $y_2$ has about 10% overshoot.

The detailed procedures of model matching will now be described. The operation of the controller is given as follows:

$$C(s)/s = (C_0 + C_1 s + C_2 s^2 + \ldots)/s \quad (55)$$

Equations (55), (50) and (45) are substituted into equation (43) to obtain the following equation:

$$I + s(C_0 + C_1 s + C_2 s^2 + C_3 s^3 + C_4 s^4 + \ldots)^{-1} \times \quad (56)$$
$$(H_0 + H_1 s + H_2 s^2 + H_3 s^3 + H_4 s^4 + \ldots) =$$
$$I + \Sigma s + \Gamma_2 \Sigma^2 s^2 + \Gamma_3 \Sigma^3 s^3 + \Gamma_4 \Sigma^4 s^4 + \ldots$$

When matching is started from a low-order term with respect to s, the following equations are obtained:

$$\left. \begin{array}{l} C_0^{-1} H_0 = \Sigma \\ C_0^{-1} H_1 - C_0^{-1} C_1 C_0^{-1} H_0 = \Gamma_2 \Sigma^2 \\ C_0^{-1} H_2 - C_0^{-1} C_1 C_0^{-1} H_1 + \{C_0^{-1}(C_1 C_0^{-1})^2 \\ \quad - C_0^{-1} C_2 C_0^{-1}\} H_0 = \Gamma_3 \Sigma^3 \\ C_0^{-1} H_3 - C_0^{-1} C_1 C_0^{-1} H_2 + \{C_0^{-1}(C_1 C_0^{-1})^2 \\ \quad - C_0^{-1} C_2 C_0^{-1}\} H_1 - \{C_0^{-1}(C_1 C_0^{-1})^3 \\ \quad - C_0^{-1} C_1 C_0^{-1} C_2 C_0^{-1} - C_0^{-1} C_2 C_0^{-1} C_1 C_0^{-1} \\ \quad + C_0^{-1} C_3 C_0^{-1}\} H_0 = \Gamma_4 \Sigma^4 \end{array} \right\} \quad (57)$$

C and C* have the following relationships in accordance with equations (42) and (55):

$$\left. \begin{array}{l} C_0^* = C_0 \\ C_1^* = C_1 \\ C_2^* = C_2 + C_1 T/2 \\ C_3^* = C_3 + C_2 T + C_1 T^2/3 \end{array} \right\} \quad (58)$$

$C_0^*$, $C_1^*$, $C_2^*$ and $C_3^*$ are given in accordance with equations (57) and (58) as follows:

$$C_0^* = H_0 \Sigma^{-1} \quad (59)$$
$$C_1^* = H_1 \Sigma^{-1} - H_0 \Gamma_2 \quad (60)$$
$$C_2^* = (H_2 + H_1 T/2)\Sigma^{-1} - (H_1 \Gamma_2 + H_0 \Gamma_2 T/2) + \quad (61)$$
$$\qquad H_0(\Gamma_2^2 - \Gamma_3)\Sigma$$
$$C_3^* = (H_3 + H_2 T + H_1 T^2/3)\Sigma^{-1} - \quad (62)$$
$$\qquad (H_2 + H_1 T + H_0 T^2/3)\Gamma_2 +$$
$$\qquad (H_1 + H_0 T)(\Gamma_2^2 - \Gamma_3)\Sigma - H_0(\Gamma_2^3 - 2\Gamma_2\Gamma_3 + \Gamma_4)\Sigma^2$$

$C_0^*$ and $C_1^*$ are used for PI operation, and $C_0^*$, $C_1^*$ and $C_2^*$ are used for PID operation. Therefore, $\Sigma$ is obtained in accordance with equations (60) to (62) for $C_2^*=0$ in PI operation or for $C_3^*=0$ in PID operation. $\Sigma$ is obtained as a minimum positive root of the following equation:

For PI operation:

$$(\Gamma_2^2 - \Gamma_3)\Sigma^2 - \{[H_0^{-1} H_1]_{diag} + T/2\}\Gamma_2\Sigma + [H_0^{-1}(-H_2 + H_1 T/2)]_{diag} = 0 \quad (63)$$

For PID operation:

$$(\Gamma_2^3 - 2\Gamma_2\Gamma_3 + \Gamma_4)\Sigma^3 - \quad (64)$$
$$\{[H_0^{-1} H_1]_{diag} + T\}(\Gamma_2^2 - \Gamma_3)\Sigma^2 +$$
$$\{[H_0^{-1}(H_2 + H_1 T)]_{diag} + T^2/3\}\Gamma_2\Sigma -$$
$$[H_0^{-1}(H_3 + H_2 T + H_1 T^2/3)]_{diag} = 0$$

where $[M]_{diag}$ is the diagonal matrix when all nondiagonal matrix elements of the N×N square matrix M are set to be zero.

When $\Sigma$ is obtained, $C_0^*$, $C_1^*$, $C_2^*$ and $C_3^*$ are obtained. The digital PID parameters Kc, Ti, Td are obtained as follows:

$$Kc = \begin{bmatrix} K_{11} & K_{12} & \cdots & K_{1N} \\ & & & \\ \vdots & K_{jk} & & \vdots \\ & & & \\ K_{N1} & \cdots & & K_{NN} \end{bmatrix} = \begin{bmatrix} C^*_{111} & \cdots & & C^*_{11N} \\ & & & \\ \vdots & & C^*_{1jk} & \vdots \\ & & & \\ C^*_{1N1} & \cdots & & C^*_{1NN} \end{bmatrix} \quad (65)$$

$$T_i = \begin{bmatrix} T_{11} & T_{12} & \cdots & T_{1N} \\ & & & \\ \vdots & T_{jk} & & \vdots \\ & & & \\ T_{N1} & \cdots & & T_{NN} \end{bmatrix} = \begin{bmatrix} C^*_{111}/C^*_{011} & \cdots & C^*_{11N}/C^*_{01N} \\ & & \\ \vdots & C^*_{1jk}/C^*_{0jk} & \vdots \\ & & \\ C^*_{1N1}/C^*_{0N1} & \cdots & C^*_{1NN}/C^*_{0NN} \end{bmatrix} \quad (66)$$

$$T_d = \begin{bmatrix} T'_{11} & T'_{12} & \cdots & T'_{1N} \\ & & & \\ \vdots & T'_{jk} & & \vdots \\ & & & \\ T'_{N1} & \cdots & & T'_{NN} \end{bmatrix} = \quad (67)$$

$$\begin{bmatrix} C^*_{211}/C^*_{111} & \cdots & C^*_{21N}/C^*_{11N} \\ & & \\ \vdots & C^*_{2jk}/C^*_{1jk} & \vdots \\ & & \\ C^*_{2N1}/C^*_{1N1} & \cdots & C^*_{2NN}/C^*_{1NN} \end{bmatrix}$$

According to the embodiment described above, a process control apparatus is provided wherein the dynamic characteristics of the multi-input/output process are identified during the closed loop control, and model matching is performed using the identified dynamic characteristics, thereby automatically tuning the digital PID parameters of the controller. Therefore, the period required for tuning the controller can be shortened, so that the process can be effectively operated. Furthermore, the decoupled reference model is selected in model matching, so that the multi-input/output process having an interference between the inputs and the outputs can be properly controlled since the loops are independently controlled. In addition to these advantages, the response shape of the reference model can be changed in accordance with a change in parameter for each loop. Therefore, a process control apparatus can be applied to all types of process. In the above embodiment, one-input/output processes and a multi-input/output process having no interference are included, so tht the apparatus according to the present invention can be readily applied to any type of process.

What is claimed is:

1. A process control apparatus for an N- (where N is any positive-integer not less than 2) input/output process comprising:

Proportional-Integral-Derivative (PID) controller means for controlling said process in accordance with PID parameters and control errors as differences between N outputs from said process and set-point signals for the N outputs;

signal generating means for superposing N persistently exciting identification signals on the N inputs to said process;

identifying means for identifying Z-transfer functions corresponding to all input-to-output combinations, in accordance with the N inputs to said process and the N outputs from said process, while the N persistently exciting identification signals are superposed on the N inputs;

calculating means for calculating an S-transfer function of said process in accordance with identified Z-transfer functions; and tuning means for matching an S-transfer function between a set-point signal for a process control system and a process output which is obtained from a calculated S-transfer function with an S-transfer function of an N-input/output decoupled reference model with no interference between process variables, and for tuning the PID parameters of said PID controller means in accordance with matched results.

2. The apparatus according to claim 1, in which said signal generating means generates a maximum period sequence signal as an identification signal.

3. The apparatus according to claim 1, in which said identifying means identifies the Z-transfer functions in accordance with a recursive least square algorithm.

4. The apparatus according to claim 1, in which said calculating means calculates the S-transfer function by Laplace-transforming a polynomial obtained by approximating a step response of the Z-transfer function.

5. The apparatus according to claim 1, in which said tuning means includes a reference model, which is defined to include response shape parameters.

* * * * *